(No Model.) 4 Sheets—Sheet 1.

J. B. STONER.
GRAIN CONVEYER.

No. 492,879. Patented Mar. 7, 1893.

WITNESSES:

INVENTOR
John B. Stoner
BY
ATTORNEYS.

(No Model.) 4 Sheets—Sheet 2.
J. B. STONER.
GRAIN CONVEYER.
No. 492,879. Patented Mar. 7, 1893.
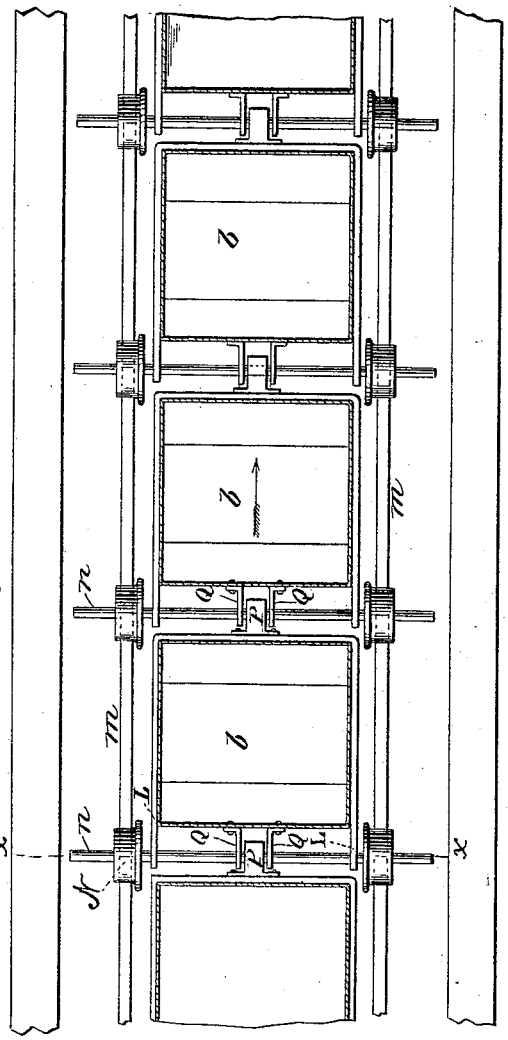
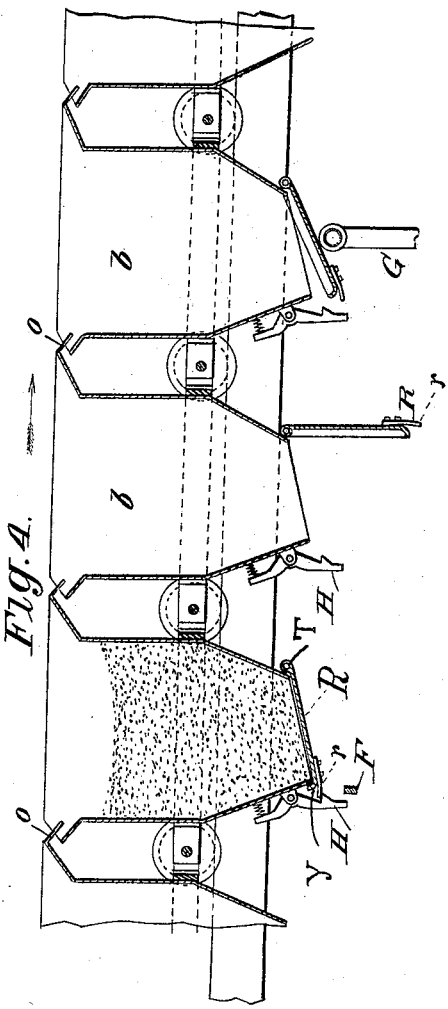
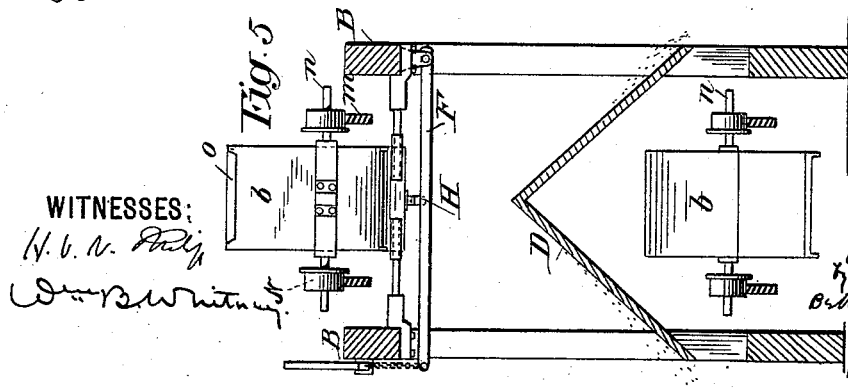
WITNESSES:
INVENTOR
John B. Stoner,
ATTORNEYS (No Model.)
J. B. STONER.
GRAIN CONVEYER.
No. 492,879.
4 Sheets—Sheet 3.
Patented Mar. 7, 1893.
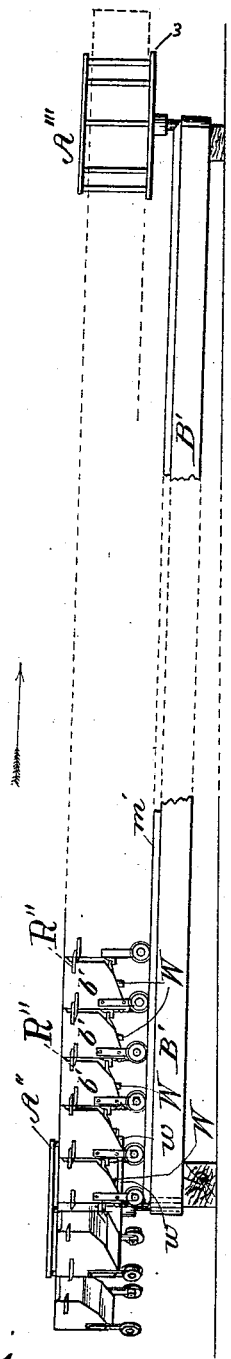
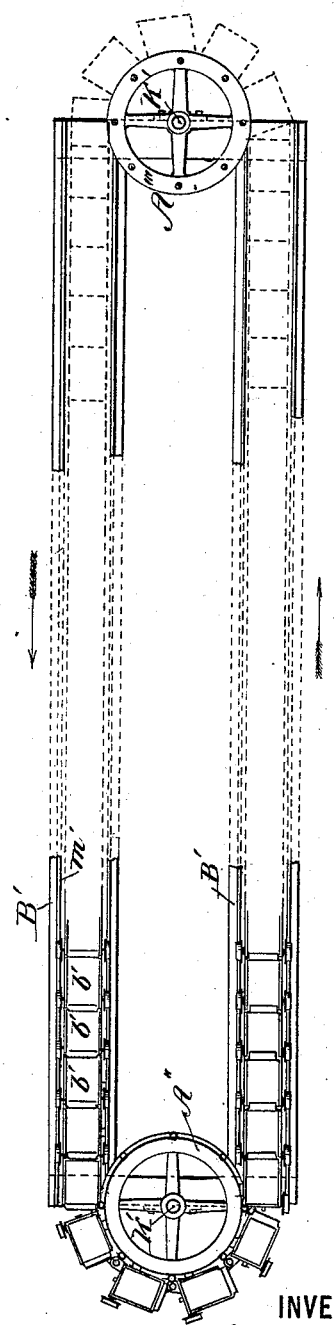
WITNESSES:
INVENTOR
BY
ATTORNEYS.

(No Model.) 4 Sheets—Sheet 4.
J. B. STONER.
GRAIN CONVEYER.
No. 492,879. Patented Mar. 7, 1893.
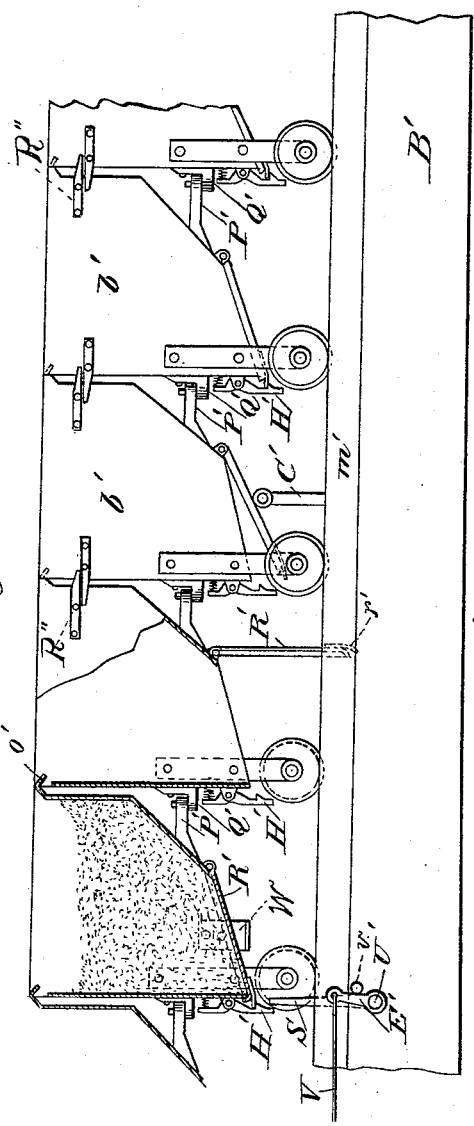
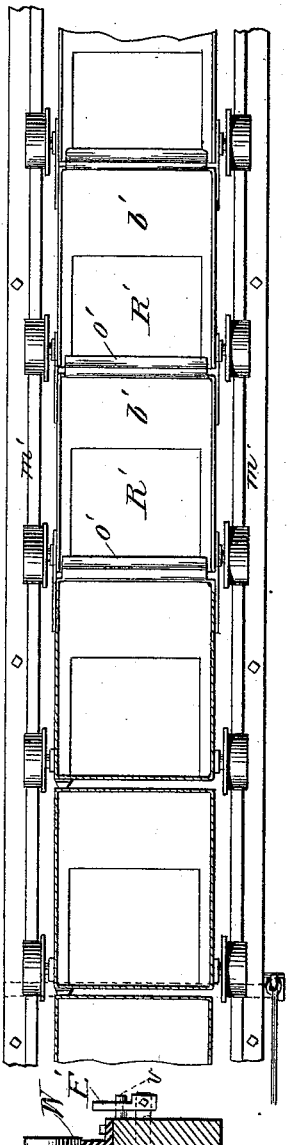
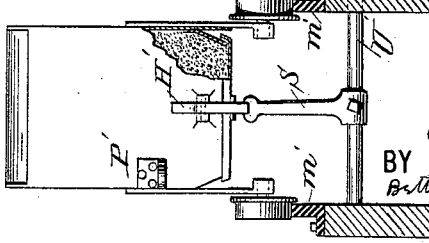
WITNESSES:
INVENTOR
John B. Stoner
BY
ATTORNEYS

UNITED STATES PATENT OFFICE.

JOHN B. STONER, OF NEW YORK, N. Y.

GRAIN-CONVEYER.

SPECIFICATION forming part of Letters Patent No. 492,879, dated March 7, 1893.

Application filed August 26, 1891. Serial No. 403,759. (No model.)

*To all whom it may concern:*

Be it known that I, JOHN B. STONER, a citizen of the United States, residing at New York, in the county of New York and State of New York, have invented certain new and useful Improvements in Grain-Conveyers, of which the following is a specification, reference being had therein to the accompanying drawings.

My invention relates to machines for conveying grain horizontally or substantially so; and the objects of my invention are to provide means of operating such a machine automatically and without injury to the grain.

To this end my invention consists first of a device whereby the weight or gravity of the grain furnishes the power for moving the same horizontally, and second of certain details of construction hereinafter set forth. I attain these objects by the mechanism illustrated in the accompanying drawings, in which similar letters of reference refer to similar parts throughout the various views.

Figure 1:
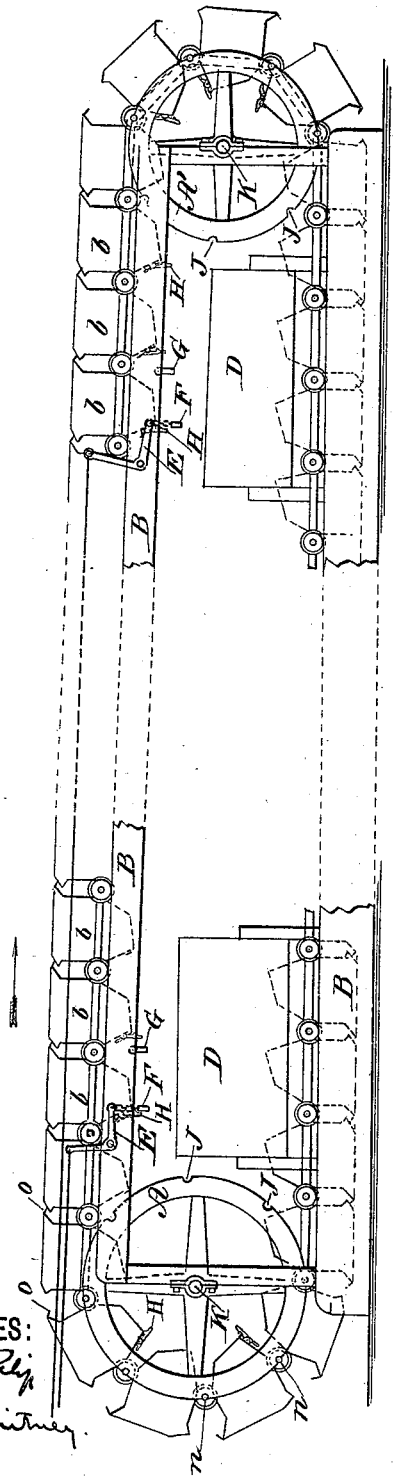
Figure 2:
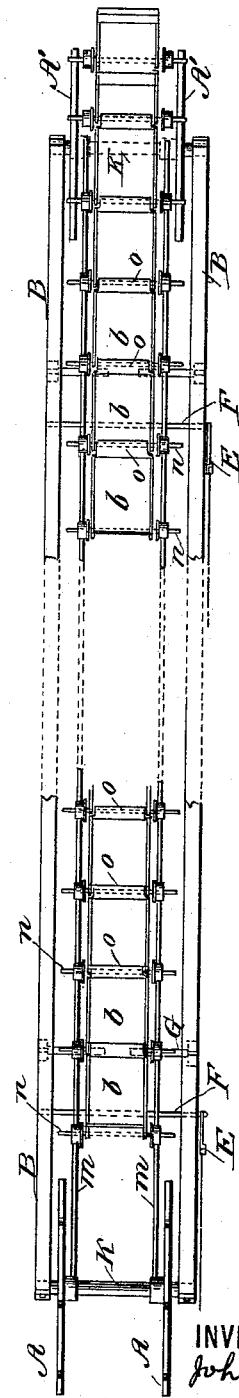

Figure 1 is a side elevation showing the several parts assembled. Fig. 2 is a top plan view showing the overlapping buckets. Fig. 3 is a plan view, showing the connecting parts of the buckets. Fig. 4 is a longitudinal sectional view and Fig. 5 is a vertical sectional view. Figs. 6, 7, 8, 9 and 10 show a modification of my invention, of which Fig. 6 is a side elevation, Fig. 7 is a top plan view, Fig. 8 is a longitudinal sectional view, Fig. 9 is a plan view, and Fig. 10 is a vertical sectional view.

Referring to Figs. 1 to 5 inclusive, B is the frame of the machine, in which the axles K of the pulley wheels A and A' are journaled, and supporting the rails m. The length of the frame B is accomodated to the greatest distance to which the grain is to be conveyed, and may be arranged to carry grain to one or more receptacles along its course, as well as to one at its extreme end. The pulley wheel A' at the delivery end of the machine is smaller than the pulley wheel A at the receiving end and its axle K is journaled in a lower horizontal plane than the axle K of pulley wheel A. Therefore the rails m, running between the pulley wheels, incline downward on the top of the machine from pulley wheel A to pulley wheel A'. I prefer to make this incline steeper at the receiving end of the machine up to about the point where the first delivery can be made, than it is through the rest of the distance from pulley wheel A to pulley wheel A', so that the weight of grain may more readily set the apparatus in motion. Upon rails m ride the buckets b; each bucket b is provided with a tongue P journaled on axle n bearing the two wheels N of the bucket at its front end, and which projects beyond said wheels and fits notches J in pulley wheels A and A', as they pass around the same. The rear ends of said buckets b bear arms L which are attached to the axle of the bucket immediately behind; and also arms Q which rest on said axle on either side of tongue P, to prevent oscillation. The series of buckets thus form an endless chain riding on rails m and around pulley wheels A and A'. The bottoms of said buckets are substantially V-shaped, so as to pass around the pulleys without interference and at the top front end are provided with overlapping lips or flanges O so that when not passing around the pulleys they overlap each other and form substantially a trough. The bottom R of each bucket is hinged at the front end and bears a tongue r at the rear end engaging with spring latch H to hold said bottom shut. Said door R is also constructed with a flange Y. This construction permits hinge T and latch H, to be so arranged that when said door is closed there will be some space between the lower edge of the bucket and the door; the flange Y operating to prevent the grain from escaping through this space. It will be readily understood that in this manner grain cannot lodge so as to prevent door R from shutting properly.

At each point of delivery between pulley wheel A and pulley wheel A' a shed or chute D is constructed over the lower course or returning branch of buckets to guide the grain as it drops from the buckets, and there is also provided a cross bar F swinging at one end on a horizontal axis and attached at the other end to a bell crank E, operated by means of a lever or other suitable device so as to raise said cross bar F so that the spring latch of each advancing bucket will engage therewith so as to unlock it and allow the bottom to drop. Beyond said point of delivery is provided a traveler G adapted to engage with and raise the bottom so that it will again be locked by spring latch H.

The operation of the machine is as follows: The receiving end A is placed underneath a grain chute and receptacles are placed at one or more of the various delivery points along the machine and at the delivery end. The chute is opened and the bucket $b$ underneath it is filled, its weight on the inclined rails $m$ tends to carry it down, if the force is not sufficient, the machine may be started by hand or any suitable device until sufficient buckets are filled to keep the machine in motion. The buckets will advance until they reach pulley wheel A′, in passing around which they will dump the grain contained in them into the receptacle at the end. If it is desired to deliver the grain at any of the points along the machine, the proper cross bar F is raised by means of its lever; the bottom of each advancing bucket will then be unlocked at that point and the grain will drop out and fall down on shed or chute D; traveler G shutting the bottom after the grain has been delivered.

Referring now to Figs. 6 to 10 inclusive, illustrating a modification of my invention B′ is the frame of the machine in which the axes K′ of the pulley wheels A″ and A‴ are journaled and supporting the rails $m'$; the pulley wheels A″ and A‴ have vertical axes K′, pulley wheel A‴ being located on a lower horizontal plane than pulley wheel A″ to allow for the proper incline of the rails $m'$. On the outer circumference of the pulleys the buckets are supported by means of flange W which rests upon the rim $w$ of said pulley wheels. The buckets $b'$ are provided with coupling blocks P′ and pins Q′ by means of which they are suitably united, and with flaps R″ by means of which they interlock so as to support each other, said buckets also have overlapping lips or flanges O′. Spring latch H′ on hinged bottom R′ is operated by means of finger S borne on crank U′, which is operated by arm E′ and rod V. The pin $v$ forms a solid support against which arm E′ abuts. Traveler C′ is arranged to shut and latch the bottom R′ when it has been allowed to drop open by the unlocking of latch H′ by finger S.

The operation of the machine is substantially the same as that already described except that there can be no dumping at the delivery end of the machine, as the buckets are not inverted on the return branch thereof.

Of course any suitable power mechanism may be connected with either of the pulley wheels for driving the machine in which case the incline may be omitted.

What I claim, and desire to secure by Letters Patent, is—

1. A machine for conveying grain which consists of rails inclined downward in the direction and along the path of conveyance, and arranged between two pulleys, buckets suitably united and having lips, and doors provided with flanges, and so arranged that when each door is closed there will be some space between the lower edge of the bucket and the door; said buckets adapted to ride on said rails and around said pulleys, and means of opening and shutting said doors automatically at certain points along said inclined rails, substantially as described.

2. In an automatic machine for conveying grain the combination of rails inclined downward in the direction and along the path of conveyance and arranged between two pulleys, and buckets suitably united and having lips, and doors provided with flanges, and so arranged that when each door is closed there will be some space between the lower edge of the bucket and the door, said buckets being adapted to ride on said rails and around said pulleys, with cross-bar and traveler, adapted to open and shut said doors respectively, substantially as described.

3. A machine for conveying grain which consists of rails inclined downward in the direction and along the path of conveyance and arranged between two pulleys having vertical axes, buckets suitably united and provided with overlapping lips, so as to form substantially a trough, and with doors having flanges and so arranged that when each door is closed there will be some space between the lower edge of the bucket and the door, said buckets being adapted to ride on said rails and around said pulleys, and means of opening and shutting said doors automatically, at certain points in the course of said buckets, substantially as described.

In testimony whereof I affix my signature, in presence of two witnesses, this 25th day of August, 1891.

JOHN B. STONER.

Witnesses:
WM. B. WHITNEY,
H. V. N. PHILIP.